(12) United States Patent
Majumder et al.

(10) Patent No.: US 7,822,742 B2
(45) Date of Patent: Oct. 26, 2010

(54) MODIFYING RELEVANCE RANKING OF SEARCH RESULT ITEMS

(75) Inventors: Rangan Majumder, Redmond, WA (US); Andrew Samuel Laucius, Seattle, WA (US); Javier Tordable, Redmond, WA (US); Ramkumar Rajendran, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/968,632

(22) Filed: Jan. 2, 2008

(65) Prior Publication Data

US 2009/0171943 A1 Jul. 2, 2009

(51) Int. Cl.
*G06F 17/30* (2006.01)
(52) U.S. Cl. ...................................... 707/722
(58) Field of Classification Search ............ 707/1, 707/5, 722; 705/27
See application file for complete search history.

(56) References Cited

U.S. PATENT DOCUMENTS

| 2003/0028512 A1* | 2/2003 | Stensmo | 707/1 |
| 2008/0004989 A1* | 1/2008 | Yi | 705/27 |
| 2008/0059453 A1* | 3/2008 | Laderman | 707/5 |

\* cited by examiner

*Primary Examiner*—Etienne P LeRoux
(74) *Attorney, Agent, or Firm*—Shook Hardy & Bacon

(57) ABSTRACT

Systems, computer-implemented methods, and computer-readable media for modifying the rank of search result items returned by a search engine are provided. A search engine determines a plurality of search result items that satisfy a user query and the order the search result items are to be presented to a user. A rank modifier determines whether any modification should be made to the rank of each search result item identified by the search engine. The rank of search result items identified as potential spam may be demoted while the rank of search result items identified to be in the language of the search query, having a high click-through rate, or as containing adjacent search terms from the search query may be promoted. The search result items are presented according to modified ranking to the querying user.

20 Claims, 4 Drawing Sheets

MODIFYING RELEVANCE RANKING OF SEARCH RESULT ITEMS

BRIEF SUMMARY

Embodiments of the present invention relate to systems, computer-implemented methods, and computer-readable media for modifying the rank of search result items returned by a search engine. A search engine determines a plurality of search result items that satisfy a user query and the order the search result items are to be presented to a user. A rank modifier determines whether any modification should be made to the rank of each search result item identified by the search engine. The rank of search result items identified as potential spam may be demoted while the rank of search result items identified to be in the language of the search query, having a high click-through rate, or as containing adjacent search terms from the search query may be promoted. The search result items are presented according to modified ranking to the querying user.

This Summary is provided to introduce a selection of concepts in a simplified that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for modifying the rank of search result items. In one aspect, a computer-implemented method for modifying search result item ranking is provided. The identification of a plurality of search result items that satisfy a user query and the order the search result items are to be presented to a user are received from a search engine. It is determined whether a modification should be made to the rank of each search result item identified by the search engine. The rank of the qualifying search result items is modified and search result items are presented to the querying user according to modified ranking.

In yet another aspect, a computer system for modifying search result item ranking is provided. The computer system comprises a search engine configured for identifying a plurality of search result items that satisfy a user query and the order the search result items are to be presented to a user. The system further comprises a rank modifier configured for determining whether a modification should be made to the rank of each search result item identified by the search engine and modifying the rank of the qualifying search result items. The system also comprises a presenting component configured for presenting the search result items according to modified ranking to the querying user.

In yet another embodiment, one or more computer readable media having computer-executable instructions embodied thereon that, when executed perform a method for modifying the rank of a search result item are provided. The identification of a plurality of search result items that satisfy a user query and the order the search result items are to be presented to a user are received from a search engine. It is determined whether each search result item identified by the search engine has been identified as spam. It is determined whether each search result item that has been identified as spam has a qualifying spam value. The rank of each of the search result items identified has a qualifying spam value is demoted. The search result items according to modified ranking are presented to the querying user.

Figure 1:
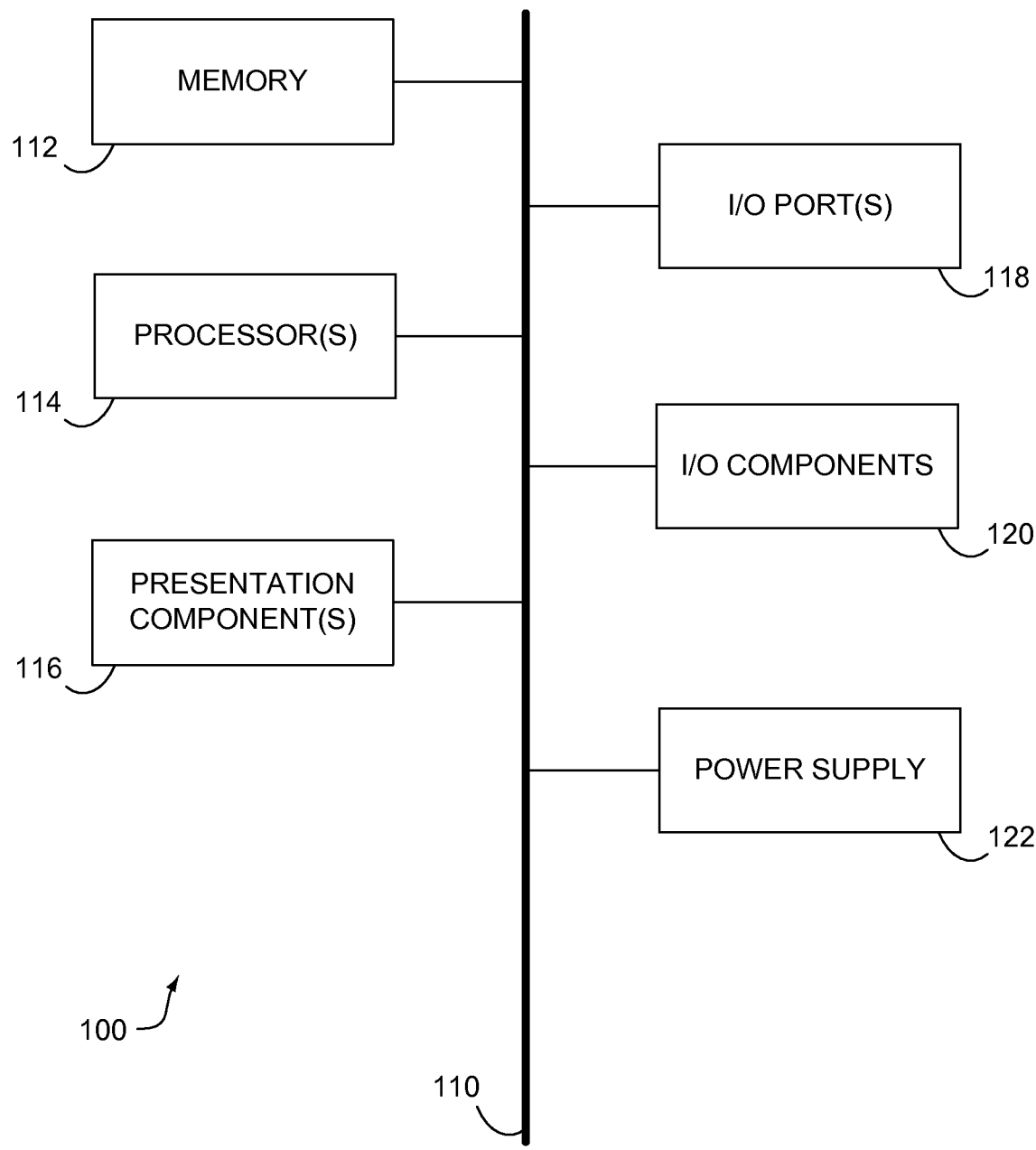
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
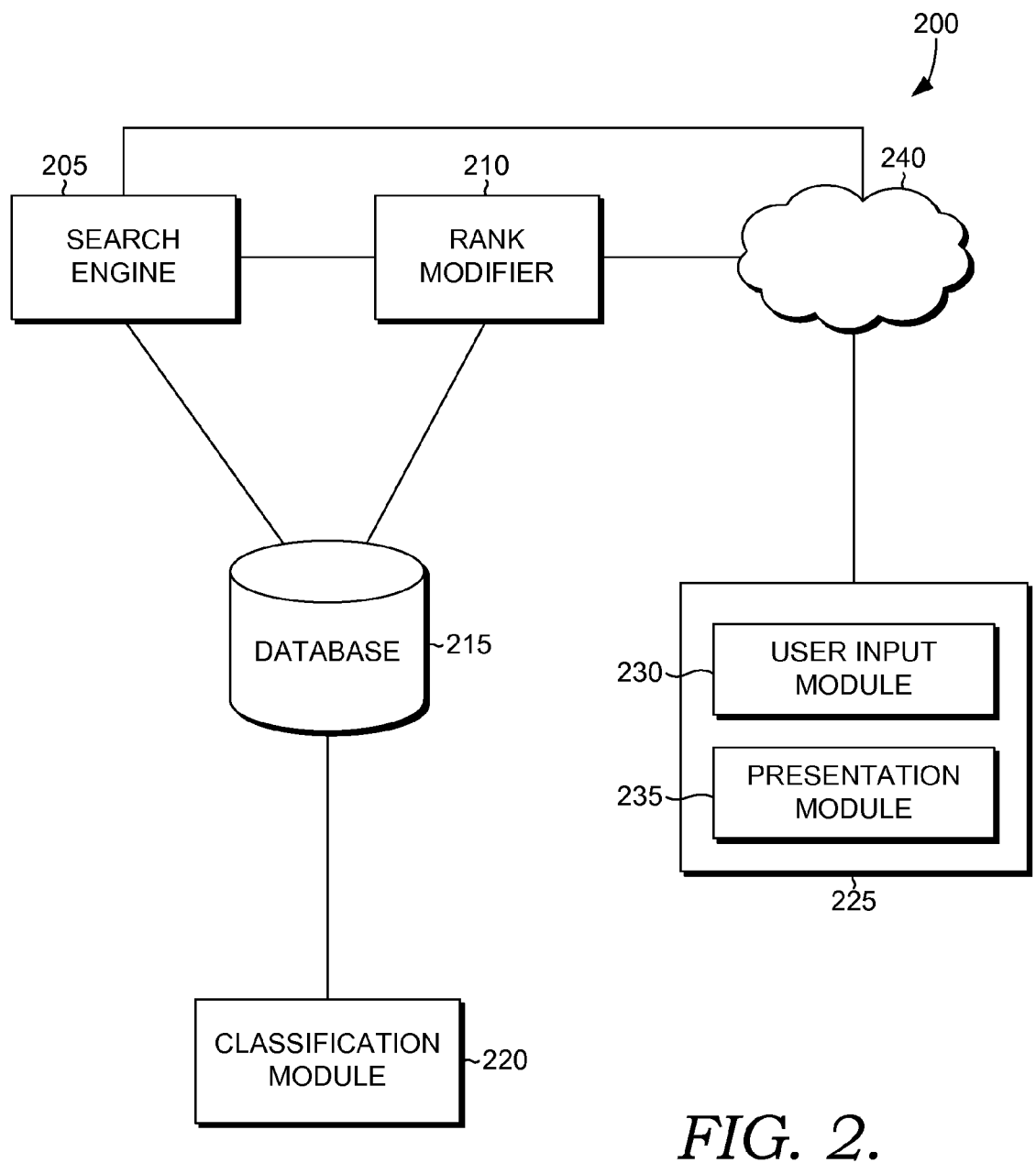
FIG. 2 is a block diagram of an exemplary computing system architecture suitable for use in implementing embodiments of the present invention.

As previously set forth, embodiments of the present invention relate to computing systems and methods for modifying the rank of a search result item. With reference to FIG. 2, a block diagram is illustrated that shows an exemplary computing system architecture 200 configured for modifying the rank of a search result item, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components.

Computing system architecture 200 includes a search engine 205, a rank modifier 210, a storage device 215, a classification module 220 and an end-user device 225. Search engine 205 and rank modifier 210 are in communication with end user device 225 via a network 240. The network 240 may include, without limitation, one or more local area networks (LANs) and/or wide area networks (WANs). Such networking environments are commonplace in offices, enterprise-wide computer networks, intranets and the Internet. Accordingly, the network 240 is not further described herein. It will also be appreciated that search engine 205 and rank modifier 210 may be in communication with one another or may be integrated into a single server or a combination of servers.

The storage device 215 is configured to store a search index and identification of web pages that may require rank modification. It will be appreciated that how the modules and components discussed below access the storage device 215 to modify a relevance ranking of a search item result may vary. In embodiments, the storage device 215 is configured to be searchable by the search engine 205 and rank modifier 210. It will be appreciated by those of ordinary skill in the art that the information stored in the storage device 215 may be configurable and may include a variety of data for use by the search engine 205 and rank modifier 210. Further, though illustrated as a single, independent component, the storage device 215 may, in fact, be a plurality of storage devices, for instance a database cluster, portions of which may reside on a server, the end user device 225, another external computing device (not shown), and/or any combination thereof. The storage device 215 may also be integrated into a single server or combination of servers.

The search engine 205 is configured for determining a plurality of search result items related to (e.g., that satisfy) a received search query. A search engine results page is the listing of web pages returned by a search engine in response to a keyword query, for instance by a user. The search result items typically include one or more listings of web pages with titles, a link to the page, and a short description showing where the keywords have matched content within the page. A search engine results page may refer to a single page of web pages and links returned, or to the set of all web pages or links returned for a search query As such, in embodiments, the search engine 205 parses the received search query into one or more search terms/phrases and compares the search term(s)/phrase(s) to a search index associated with a data store (for instance, data store 215). Any search result items stored in association with the data store (e.g., data store 215) and referenced in the search index are compiled and a predetermined ranking algorithm is applied to determine how many of the satisfying results will be presented to the user and in what order.

Typically, the search engine 205 is preconfigured and programmed to return search result items and the rank associated with each of the search item results. The search engine 205 has a static configuration and applies heuristics and other information to determine the relevance of search item results and to rank of each search result item. Typically, modification of the search engine 205 requires code changes and is difficult and time-consuming. Furthermore, because modification requires code changes, when information regarding a web page is discovered or determined, the search engine 205 requires reconfiguration. For example, for each identification of a SPAM webpage, the code of the search engine 205 would have to be rewritten and modified to reflect the identification of a SPAM web page.

Typically, the search result item having a highest ranking by search engine 205 will be awarded the most prominent display position, e.g., the top link of a vertical listing of links on a search engine web page that is displayed as the result of a particular user query. Data parsing, database indexing and search result item ranking algorithms are well known to those of ordinary skill in the art and, accordingly, are not further described herein.

The classification module 220 is configured to identify items, such as web pages, that may require modification of the rank determined by the search engine 205. The identification of web pages that may require modification is performed by the classification module 220 in addition to and separate from search engine's 205 determination of and ranking of a plurality of search result items related to (e.g., that satisfy) a received search query. While classification module 220 is shown as being separate from rank modifier 210, it will be appreciated that embodiments, the rank modifier and classification module may be integrated. The functionality of classification module 220 may be integrated into rank modifier 210 such that rank modifier 210 identifies and analyzes web pages to determine whether the ranking of web pages may require rank modification and modifies the ranking of search result items accordingly.

Classification module 220 can perform multiple classifications of web pages based on a variety of parameters, including, but not limited to, SPAM page classification, primary language classification, adjacent search term classification, and click value classification. In one embodiment, the classification module 220 analyzes web pages to determine whether a web page contains data indicative of a SPAM web page (e.g., performs a content analysis). SPAM pages include web pages created deliberately to trick a search engine into offering inappropriate, redundant, or poor-quality search result items. Exemplary SPAM properties and identifiers include incomplete sentences on the web page, repeated words, and associated malware or spyware, linkage structure, page content, and page evolution. The classification module 220 is able to find web page outliers in the statistical distribution of these properties are highly likely to be caused by web spam. Furthermore, classification module 220 may assign a SPAM value or score to the web page to rate the level of confidence of the classification module 220 that the web page is a SPAM web page (e.g., the more incomplete sentences and repeated words, the higher level of confidence that the web page is a SPAM web page).

The identification of items, such as web pages, that may require rank modification along with the associated value or score may be stored in data store 215. For example, if a web page is identified as containing items indicative of a SPAM web page, an identification of the web page along with a SPAM value may be stored in data store 215 so that it may be accessed by rank modifier 210. Alternatively, the identification of the web page along with a associated value may be communicated directly to or determined by the rank modifier 210.

In another embodiment, classification module 220 analyzes web pages to determine the primary language of a web page. The identification of any search result items and associated language may be stored in data store 215 so that the information may be accessed by rank modifier 210. Furthermore, a language value or score may also be associated with each of the search result items and stored in data store 215. Alternatively, this data may be communicated directly to or determined by rank modifier 210.

In yet another embodiment, classification module 220 analyzes the content of web pages to determine whether a web page contains certain words next to one another. For example, the classification module 220 may analyze web pages to determine if they contain the terms "children's" and "shoes" next to one another. If so, the classification module 220 may identify the web page and in some instances provide word similarity score or value. The identification of web pages with adjacent search terms and an associated value or score may be stored in data store 215 for access by rank modifier 210. Alternatively, this data may be communicated directly to or determined by rank modifier 210.

In still another embodiment, classification module 220 may analyze web pages to determine the click value or click through rate of a web page. The click-through rate of a search result item is the number of user clicks or selection on a search result item per the number of times the search result item is displayed in a search results list to one or more users. The classification module 220 may identify the web page along with the associated click value may be stored in data store 215 for access by rank modifier 210. Alternatively, this data may be communicated directly to or determined by rank modifier 210.

It will be appreciated that classification module 220 may analyze web pages for a variety of classifiers and provide an associated value for use by rank modifier 210. It will be appreciated that classification module 220 may analyze web pages for multiple classifiers (e.g., analyze web pages for SPAM identifiers, language, click-throughs and repeated words). Furthermore, although classification module 220 is depicted as being a single module, it will be appreciated that multiple modules may be utilized to analyze web pages for one or more classifiers. For example, the system may include separate classification modules 220 to analyze web page for SPAM identifiers, language, click-throughs and repeated words.

Rank modifier 210 allows case-by-case modification of search result items ranking determined by the search engine 205. The rank modifier allows the modification of rank of a search result item returned by search engine 205 and produces final modified ranks of search result items.

In one embodiment, once the search engine determines the search result items and associated rankings for a particular key word query, the rank modifier searches database 215 for each identified search result item returned by the search engine to determine if any of the identified search result items returned by search engine 205 have been identified to have their rank modified. This determination occurs outside of the search engine without rewriting the code for the search engine. The rank modifier determines whether the rank provided by the search engine 205 should be "boosted", "demoted" or completely eliminated from the list of search result items based on the information in database 215.

As discussed herein, the term "boost," and variations thereof, refers to altering the positioning of a search result item in a list of search item results returned from the search engine. For instance, if "www.microsoft.com" would appear as result 15 out of a result list of 30 from search result component 205, boosting "www.microsoft.com" would alter the results list such that the document appears as, for instance, result five out of the result list of 30. As will be understood and appreciated by one of ordinary skill in the art, there are various ways to achieve the result of boosting documents.

In another example, boosting the document may involve moving the document a defined number of positions higher in a results list (e.g. 10 positions) without, obviously, ranking a document higher than the first position. In yet another example, boosting the document may involve placing the document within a specific range in the results list (e.g., top five positions, top 10 positions, first page, etc.). These and other boosting schemes are contemplated and within the scope of the present invention. Instances where rank modifier 210 boosts the ranking of search result items includes if key words from the search query are adjacent to another in a web page, web pages that have a high click rate, web pages that are in the particular language from the search query and web pages that are known to be good commercial web pages.

As discussed herein, the term "demote," and variations thereof, refers to altering the positioning of a search result item in a list of search item results returned from the search engine. For instance, if "www.microsoft.com" would appear as result 15 out of a result list of 30 from search result component 205, demoting "www.microsoft.com" would alter the search results item list such that the document appears as, for instance, result 30 out of the result list of 30.

As will be understood and appreciated by one of ordinary skill in the art, there are various ways to achieve the result of demoting documents. In another example, demoting the document may involve moving the document a defined number of positions lower in search results item list (e.g. 10 positions). In yet another example, demoting the document may involve placing the document within a specific range in the search results item list (e.g., bottom five positions, last page). These and other demoting schemes are contemplated and within the scope of the present invention. Web pages that have been identified by classification module 220 as being SPAM may be demoted by rank modifier.

For example, one of the search result items (e.g., web pages) returned by the search engine 205 was identified as being potential spam by classification module 220 with a spam value of 200. Rank modifier 210 may be configured to demote web pages with a spam value of greater than 140 to the bottom of a search result item list. As such, rank modifier 210, would demote any search result items returned by search engine 205 to the bottom of the search results page. It will be appreciated that in some instances, a web page may be falsely identified as being SPAM, and as such it may not be desirable to completely remove the web page from the search result item list returned to the querying user, but rather to demote the web page on the search result item list.

It will be appreciated that information from the key word query may also be taken into account in determining whether to modify the rank of search result items. For example, the query may be parsed into textual command that may be utilized to modify the rank of one or more search result items provided by the search engine. By way of example and not by limitation, if the user searches for "children's shoes spanish". The rank modifier 210 may look for web pages that have been identified as having the terms "children's" and "shoes" where the primary identified language of the web page is Spanish. The classification module 220 may have identified web pages with the terms "children's" and "shoes" in Spanish and stored the identification of such in database 215. As such, the ranking of pages identified having these terms and being in Spanish by the search engine would be adjusted, in particular boosted, by the rank modifier 210.

As shown in FIG. 2, the end-user device 225 includes a user input module 230 and a presentation module 235. In some embodiments, one or more of the modules 230 and 235 may be implemented as stand-alone applications. In other embodiments, one or both of the modules 230 and 235 may be integrated directly into the operating system of the end-user device 225. It will be understood by those of ordinary skill in the art that the modules 230 and 235 illustrated in FIG. 2 are exemplary in nature and in number and should not be construed as limiting. Any number of modules may be employed to achieve the desired functionality within the scope of embodiments hereof.

The user input module 230 is configured for receiving input of search query terms. Typically, search query terms are input via a user interface (not shown) associated with the end-user device, or the like. Upon receiving input of search query terms, the presentation module 235 of the end-user device 230 is configured for presenting search result items determined by the search engine and modified by the rank modifier in order by a rank number. In one embodiment, the presentation module 235 presents a plurality of relevant search result items and links utilizing a display device associated with the end-user device 225. Embodiments, however, are not intended to be limited to visual display but rather may also include audio presentation, combined audio/video presentation, and the like.

Figure 3:
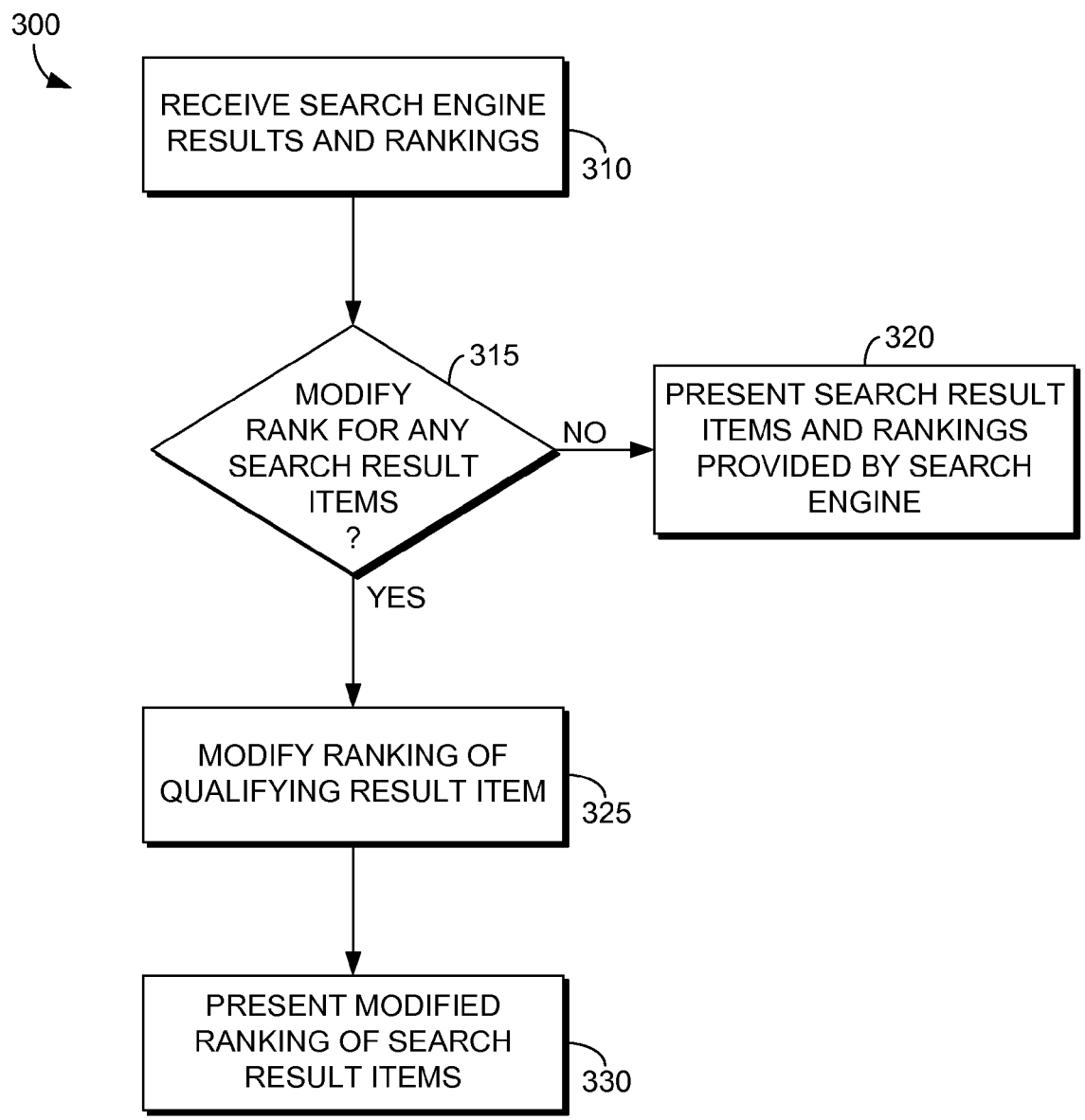
FIG. 3 is a flow diagram illustrating methods for modifying the rank of one or more search result items in accordance with an embodiment of the present invention.

Referring next to FIG. 3, a method 300, for modifying the rankings of search result items returned by a search engine is provided. A key word query is received by a search engine. The appropriate search result items and associated rankings are determined by the search engine and the search result items and associated rankings are received at step 310. At step 315, it determined whether to modify the rank for any of the search result items returned by the search engine. If not, at step 320, the search result item list is presented according to the rankings provided by the search engine.

If at step 315, it is determined that one or more of the search result items returned by the search result item are to be modified, at step 325 the ranking of the qualifying search results are modified accordingly. The search result items list is presented to the querying user according to the modified ranking of the search result items.

Figure 4:
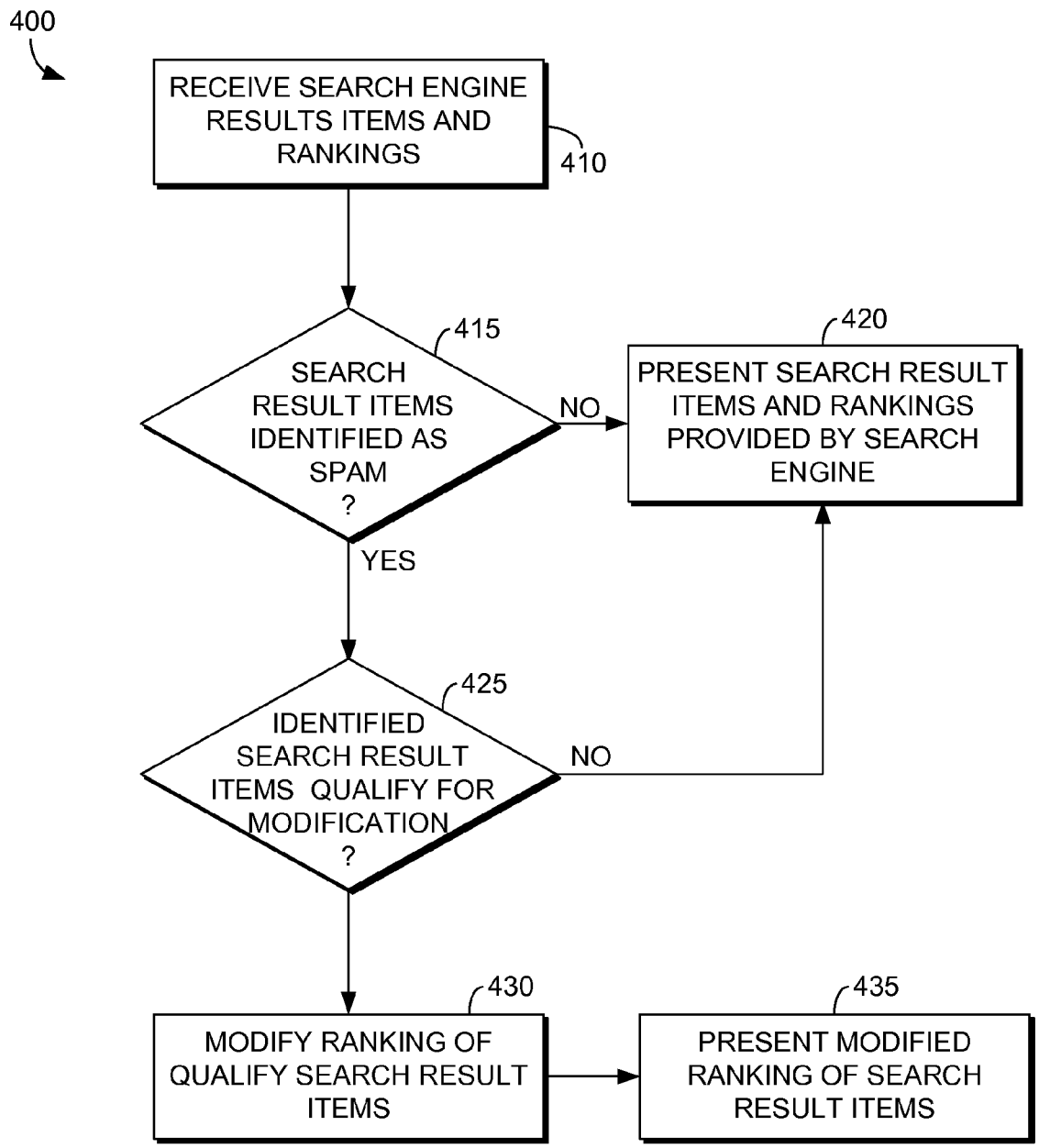
FIG. 4 is a flow diagram illustrating a method for demoting a search result item as a SPAM item in accordance with an embodiment of the present invention.

With reference to FIG. 4, a method 400 for modifying the ranking of search result items identified as spam pages is provided. A key word query is received by a search engine. The appropriate search result items and associated rankings are determined by the search engine and the search result items and associated rankings are received at step 410. At step 415, it determined whether to any of the search result items returned by search engine were identified by the classification module as SPAM. If not, at step 420, the search result item list is presented according to the rankings provided by the search engine.

If at step 415, it is determined that one or more of the search result items returned by the search result item are identified as being potential SPAM, at step 425 it is determined whether the identified search item results qualify for modification. For example, if the search result items have been assigned a SPAM value, whether the assigned SPAM value is above the threshold for modifying the rank of the search result items identified as potential SPAM. If one or more search result items, at step 430 the ranking of the qualifying search results are modified accordingly. The search result items list is presented to the querying user according to the modified ranking of the search result items. If at step 425, one or more of the search result items do not qualify for modification, at step 420 the search result item list is presented according to the rankings provided by the search engine Information from the parsed query may also be taken into account to determine whether to modify the ranking of a search result item provided by the search engine. By way of example and not by limitation, if the user searches for "children's shoes". The rank modifier 210 will look for web pages that have been identified as having the terms "children's" and "shoes" adjacent to on another. The classification module 220 may have identified web pages with the terms "children's" and "shoes" adjacent to another and stored the identification of such in database 215. As such, the ranking of pages identified as have these adjacent terms by the search engine would be adjusted, in particular boosted, by the rank modifier 210 without modifying the code of search engine 205.

By way of example, and not by limitation, a user enters a query for "children's shoes." Search engine 205 parses the received search query into one or more search terms/phrases and compares the search terms/phrases to a search index of data store 215. The search engine returns the following search result items and rankings for a search query for "children's shoes":

1. www.kidzshoes.com
2. www.shoes.com
9. www.womenshoes.com
10. www.menshoes.com Upon receipt of the search result items and rankings from search engine 205, the rank modifier 210 determines that www.kidzshoes.com has identified as being a potential SPAM page by classification module 220 with a SPAM value of 190. Identification of the web page and associated SPAM value was stored by classification module 220 in data store 215. Rank modifier 210 has been configured to demote pages classified as potential SPAM web pages having a SPAM value of more than 140 to the end of a search result item list. As such, the new exemplary rankings of search result items to be returned to the querying user for the search query "children's shoes" as modified by rank modifier 210 is as follows:

1. www.shoes.com
8. www.womenshoes.com
9. www.menshoes.com
10. www.kidzshoes.com As www.kidzshoes.com was identified as being a spam web page by classification module 220, rank modifier 210 demotes www.kidzshoes.com to the lowest rank of 10 on the search result list returned to a user rather than completely removing from the search item result list. This modified search result list with the modified rankings is presented to a user by presentation module 235.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A computer-implemented method for modifying a search-result item ranking, the method comprising:
    receiving by a server-side rank modifier a search-result item that is deemed by a search engine to satisfy a user query and that is assigned by the search engine an order position in which to be presented to a user;
    searching by the server-side rank modifier a database to determine that the search-result item includes a classification;
    based on the classification, modifying by the server-side rank modifier the order position of the search-result item, thereby assigning to the search-result item a modified rank; and
    providing the search-result item to a client to be presented according to the modified rank.

2. The method of claim 1, wherein the search-result item is a web page.

3. The method of claim 2, wherein the classification indicates that the search-result item includes spam.

4. The method of claim 3, wherein modifying the order position based on the classification includes demoting a rank of the search-result item based on the search-result item including spam.

5. The method of claim 2, further comprising:
    determining that the search-result item includes a particular language identified from the user query.

6. The method of claim 5, further comprising:
    promoting a rank of the search-result item based on the search-result item including the particular language.

7. The method of claim 2, further comprising:
    determining that the search-result item includes two search terms of the user query that are adjacent to one another.

8. The method of claim 7, further comprising:
    promoting a rank of the search-result item based on the search-result item including the two search terms adjacent to one another.

9. The method of claim 2, further comprising:
    determining that the search-result item includes a high click-through rate.

10. The method of claim 9, further comprising:
    promoting a rank of the search-result item based on the search-result item having the high click-through rate.

11. A computer system for modifying a search-result item ranking, the system comprising:
    a search engine that deems a search-result item to satisfy a user query and that defines an order position of the search result item, wherein the order position suggests an order in which the search-result item should be presented;
    a classifier that assigns a classification to the search-result item, wherein the search-result item is stored in a database together with a classification value that quantifies the classification; and
    a rank modifier that receives the search-result item and the order position from the search engine,
        (a) wherein the rank modifier references the database to determine that the search-result item includes the classification, and
        (b) wherein, based on the classification value, the rank modifier modifies the order position to assign the search-result item a modified rank, thereby modifying the order position without modification of code of the search engine.

12. The system of claim 11, wherein the search-result item is a web page.

13. The system of claim 12, wherein the classification is spam and the classification value quantifies a confidence that the web page includes spam.

14. The system of claim 13, wherein the rank modifier demotes the order position to include the modified rank based on the classification and the classification value.

15. The system of claim 12, wherein the rank modifier determines that the search-result item includes a particular language identified from the user query.

16. The system of claim 15, wherein the rank modifier promotes the order position to include the modified rank based on the search-result item including the particular language.

17. The system of claim 12, wherein the rank modifier determines that the search-result item includes two search terms of the user query that are adjacent to one another.

18. The system of claim 17, wherein the rank modifier promotes the order position to include the modified rank based on the search-result item including the two search terms that are adjacent.

19. The system of claim 12, wherein the rank modifier determines that the search-result item includes a high click-through rate and wherein the rank modifier promotes the order position to include the modified rank based on the search-result item having the high click-through rate.

20. One or more computer readable media having computer-executable instructions embodied thereon that, when executed, perform a method for modifying the rank of a search-result item, the method comprising:

receiving by a server-side rank modifier a search-result item that is deemed by a search engine to satisfy a user query and that is assigned by the search engine an order position in which to be presented to a user;

searching by the server-side rank modifier a database to determine that the search-result item has been identified to include spam and that the search result-item has been assigned a spam value, which quantifies a confidence that the search-result item includes spam;

based on the search-result item including spam and the spam value, demoting the order position to assign the search-result item a modified rank; and providing the search-result item to a client to be presented according to the modified rank.

\* \* \* \* \*